United States Patent
Harres

(10) Patent No.: US 7,231,634 B2
(45) Date of Patent: Jun. 12, 2007

(54) METHOD FOR DETERMINING SCOPE AND CAUSE OF MEMORY CORRUPTION

(75) Inventor: John M. Harres, Thornton, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 605 days.

(21) Appl. No.: 10/245,017

(22) Filed: Sep. 17, 2002

(65) Prior Publication Data

US 2004/0054989 A1    Mar. 18, 2004

(51) Int. Cl.
*G06F 9/44* (2006.01)
*G06F 12/00* (2006.01)

(52) U.S. Cl. ...................................... 717/125; 711/161
(58) Field of Classification Search ................ 718/104; 717/126–128, 130, 147, 154, 124; 707/100, 707/206; 712/244; 711/147; 714/26, 45, 714/4, 42, 48
See application file for complete search history.

(56) References Cited

U.S. PATENT DOCUMENTS

| | | | | |
|---|---|---|---|---|
| 5,790,777 A | * | 8/1998 | Izuta et al. ................... | 714/45 |
| 5,999,933 A | * | 12/1999 | Mehta ......................... | 707/100 |
| 6,581,156 B1 | * | 6/2003 | Meyer ......................... | 712/244 |
| 6,681,348 B1 | * | 1/2004 | Vachon ........................ | 714/45 |
| 6,738,928 B1 | * | 5/2004 | Brown ......................... | 714/26 |
| 6,763,517 B2 | * | 7/2004 | Hines .......................... | 717/124 |
| 7,062,677 B1 | * | 6/2006 | Chigurupati .................. | 714/25 |
| 2003/0005414 A1 | * | 1/2003 | Elliott et al. ................. | 717/128 |
| 2003/0188227 A1 | * | 10/2003 | Maison et al. ................. | 714/42 |

* cited by examiner

*Primary Examiner*—Tuan A. Vu
(74) *Attorney, Agent, or Firm*—Michael C. Martensen; William J. Kubida; Hogan & Hartson LLP

(57) ABSTRACT

A method for analyzing memory after a system panic to identify scope and cause of memory corruption. The method includes retrieving a memory image for a computer system and identifying a data structure in the memory image that caused the panic. A rule set for the identified data structure is selected and applied to the memory image to determine a scope of the memory corruption. The method includes identifying data structures in the memory that are related to the identified data structure by type, structure, content, or location and applying the rule set to this subset of data structures. The method may include generating the rule set for the identified data structure and then validating the created rule set such as by applying it to data structures that are known to be uncorrupted. The corrupted data structures are then processed to determine a cause of the corruption.

17 Claims, 3 Drawing Sheets

METHOD FOR DETERMINING SCOPE AND CAUSE OF MEMORY CORRUPTION

BACKGROUND OF THE INVENTION

1. Field of the Invention

The present invention relates, in general, to memory management and debugging tools, and, more particularly, to software, systems and methods for determining a scope of data corruption in a computer system memory and, in some cases, a potential cause of such corruption by examining a crash dump file or core file that was created in response to corrupted memory in the computer system.

2. Relevant Background

Computer system designers and analysts face the ongoing and often difficult task of determining how to fix or improve operation of a computer system that has experienced an unexpected exception or is failing to operate as designed (e.g., is experiencing errors caused by software problems or "bugs"). When a problem or bug in the computer system software is serious enough to stop or interrupt the execution of a running program, this failure is known as a crash. Often, the cause of the crash or panic can be linked to one or more data structures or chunks of memory. However, it is often difficult to determine what caused the corruption of the data structure, whether similar or related data structures have been corrupted, and in general, the scope or size of the data corruption in the computer system memory.

In computer systems, memory is an important resource that must be carefully managed and most computer systems include a memory manager as part of the operating system to keep track of which parts of memory are in use and which parts are not in use, to allocated memory to processes when they need it and to deallocate it when they are done, and to otherwise manage memory allocation and use. While some computers only provide access to memory to one process or program, most computer systems allow multiprogramming which requires the memory manager to properly partition memory to protect one portion of memory and stored data structures from access from other programs, to properly relocate memory such that programs loading data do not exceed allocated partition sizes and overwrite data in neighboring partitions, and to otherwise protect data in memory from damage or corruption during operation of the computer system. Memory allocation is not stagnant with the memory manager continually relocating program memory addresses, changing the sizes of partitions, and reallocating memory for new processes as the number and variety of programs changes. At any time in the operation of a computer system, the image of memory will therefore vary significantly which can make it more difficult to identify corrupt memory, scope of memory problems, and causes of memory corruption.

To assist in identifying bugs in the software operating on a computer system such as those that corrupt memory, software applications are often configured to write a copy of the memory image of the existing state of the application or kernel at the time of the crash or exception into a file. These memory image files are sometimes called core files or core dumps. The system-level commands or programs in the operating system, i.e., the kernel software, are of particular interest to system analysts in correcting bugs in a crashed computer system. For example, in UNIX®-based systems, the kernel is the program that contains the device drivers, the memory management routines, the scheduler, and system calls. Often, fixing bugs begins with analysis of these executables, which have their state stored in a kernel core file. Similarly, at the user level or in the user space, programs or binaries (e.g., binary, machine readable forms of programs that have been compiled or assembled) can have their state stored in user core files for later use in identifying the bugs causing the user applications to crash or run ineffectively.

In practice, a panic or other problem occurs in an operating computer system, such as when memory becomes corrupted. In response, the system operator transfers a copy of the core file or memory image of the computer system at the time of the panic to a system analyst (such as a third party technical support service) for debugging. However, debugging a program, application, or kernel based solely on the core file can be a very difficult and time-consuming task as many crashes are causes by corruption of memory in one form or another. In many system core dumps or core files, a debugger can relatively easily identify a single corrupted data structure (e.g., any structure that can hold information useful to operation of a computer system or program including memory addresses, values or variable information, data, and the like and may be large in size or down to one byte range) as a cause of the panic in the computer system. In contrast, it typically is not clear or obvious from the core file if other data or data structures in memory are also corrupted or what caused the corruption. Without knowing the scope of the corruption, it is a difficult and costly task for a debugger to determine the source or cause of the corruption as the debugger often cannot identify whether a pattern of corruption exists or whether the corruption began at a point in memory differing from the identified piece of memory that caused the panic.

Hence, there remains a need for improved methods and mechanisms for use in determining a scope, size, and/or cause of memory corruption in a computer system based on a crash dump file or a core file.

SUMMARY OF THE INVENTION

The present invention addresses the above problems by providing a mechanism and method for determining the scope or size of data corruption in a system memory. In some embodiments, once the scope of corruption is determined all or a portion of the corrupted data structures are further processed to identify patterns in the corruption to find a likely cause for the corruption. For example, in many system core dumps, a single corrupted data structure can be identified as a cause of a panic. The mechanisms and methods of the invention can be employed to determine whether other related data structures are also corrupted to find the scope of the problem. The data structures may be related by location, e.g., the data structure causing the panic is one of a plurality of data structure members assigned a range of memory address, and/or by construction, i.e., a set of data structures that is created based or follows a set of data structure rules defining the content or configuration of the data structure. These related data structures are examined to determine whether they are corrupted, and if so, the analysis mechanism and method of the invention then processes the set of corrupted data structures to find a pattern to the corruption which often will provide an indication of the cause of the corruption.

More particularly, a computer-based method is provided for analyzing computer system memory typically after a system panic or crash to identify scope and a cause of memory or data corruption. The method includes retrieving an image for memory in a client computer system and identifying a data structure in the memory image that caused or is linked to the system panic. A data structure rule set is selected based on this identified data structure and then applied to the memory image to determine a scope of the corruption in the client computer system memory. The scope is typically provided as a listing of other data structures in the memory of the client computer system that are also corrupted, and the method may include identifying a set of data structures in the memory that are related to the identified data structure by type, structure, content, location, or other parameters and then applying the rule set only to this subset of data structures. The method may further include generating the rule set for the identified data structure and then validating the created rule set such as by applying it first to data structures that are known to be uncorrupted (and/or known to be corrupted in a particular manner). Additionally, the method in some embodiments includes processing the data structures that are corrupted to determine a cause of the corruption, such as by first identifying a pattern to the corruption. The method may further include receiving a core file or crash dump from a client computer system and storing the file for later retrieval of the memory image. The results of the scope determination and cause analysis are in some cases reported to a debugger on a user interface and/or to the client computer system.

DETAILED DESCRIPTION OF THE PREFERRED EMBODIMENTS

Figure 1:
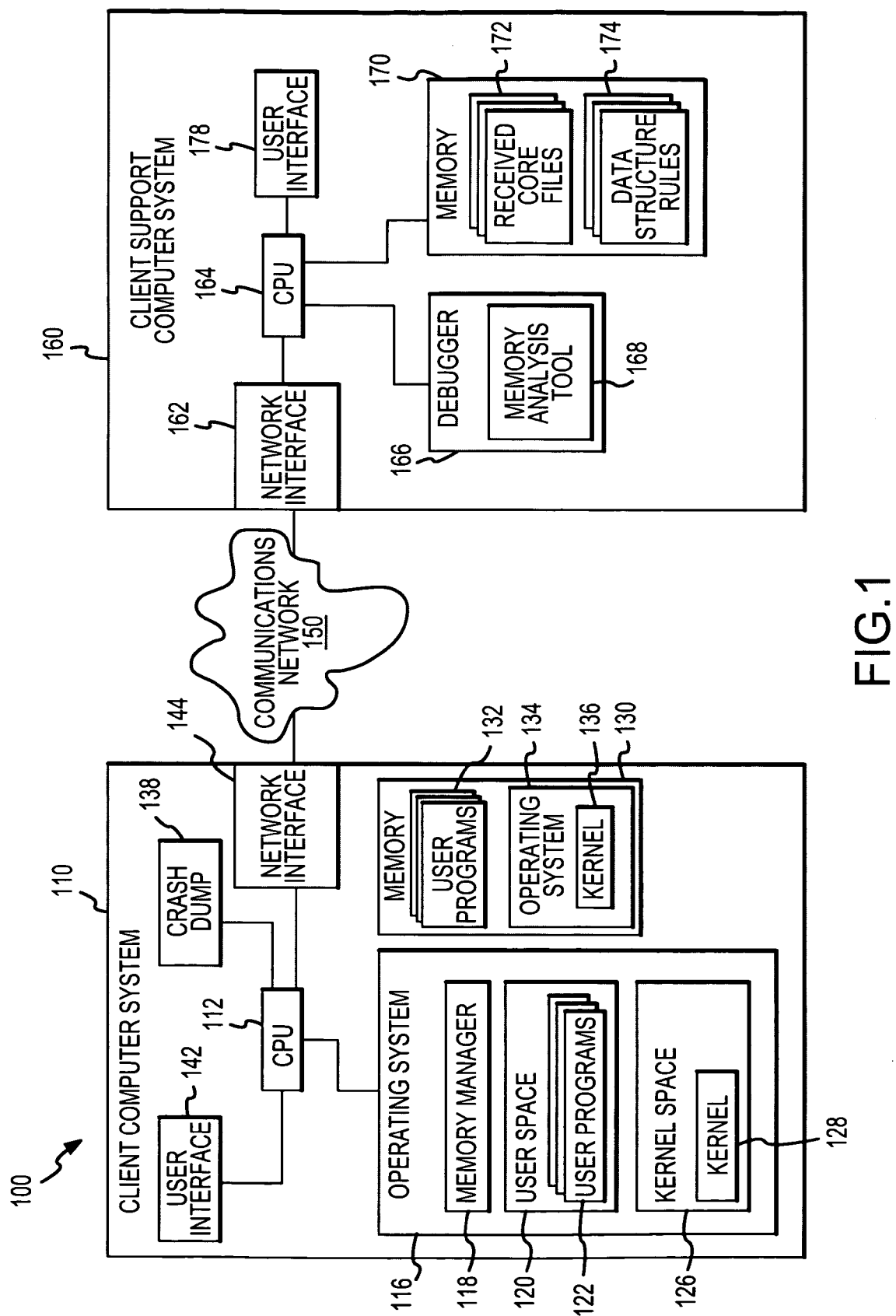
FIG. 1 illustrates in block diagram form a technical support system according to the present invention including a client support computer system utilizing a debugger with a memory analysis tool for determining the scope or size of data corruption in memory of a computer system.

In the following discussion, computer systems and network devices, such as client computer system 110 and client support computer system 160 of FIG. 1, are described in relation to their function rather than as being limited to particular electronic devices and computer architectures. To practice the invention, the computer and network devices may be any devices useful for providing the described functions and may include well-known data processing and communication devices and systems such as personal, laptop, and notebook computers with processing, memory, and input/output components and server devices configured to maintain and then transmit digital data over a communications network. Data, including client requests and transferred core files and transmissions to and from the client support computer system, typically is communicated in digital format following standard communication and transfer protocols, such as TCP/IP, HTTP, HTTPS, and the like, but this is not intended as a limitation of the invention. The invention is directed generally toward debugging programs and applications including user programs and kernels and is intended to be used for determining the scope of data corruption in a client computer system and the cause of such corruption, e.g., a problem or bug in a user program or a kernel, but is not limited to a specific programming language, operating system, or computer system hardware and/or software configuration.

FIG. 1 illustrates an exemplary technical support system 100 incorporating a client support computer system 160 that is configured according to the invention to assist a user or debugger in determining an extent of a memory corruption in client computer system 110. During typical operation of the system 100, a client (such as client computer system 110) transmits a request for assistance in identifying a cause of data and/or memory corruption occurring during operation of their system, such as in response to a system crash or panic. The assistance request includes a copy of the core file or crash dump file for the system or portion of the system (or this file is obtained later) and the client support computer system 160 acts to debug a program that caused the problem or crash based on the crash dump file and such debugging is facilitated by features of the invention that enable a debugger to determine more accurately the scope of memory corruption and, at least in some cases, the cause of such corruption.

As shown, the system 100 includes a client computer system 110 linked to the client support computer system 160 via communications network 150 (e.g., the Internet, a LAN, a WAN, and the like) for communicating debugging requests, for transferring copies of crash dump files (or other program information), and for reporting debugging results from the client support computer system 160 to the client computer system 110. The client computer system 110 may take many forms but generally will include at least one CPU 112 to manage operation of the system 110 including functioning of the operating system 116, storage of data in memory 130, display of data or information to a user via a user interface 142 (such as a GUT or command line interface), and communications with other devices over network 150 via network interface 144. The CPU 112 (or a program in system 110) is adapted to generate a crash dump or core image 138, such as in a response to a system panic, that includes information pertaining to or images of the current state of memory 130 at the time of the panic or generation of the crash dump 138. A copy of the crash dump 138 is typically provided to the client support computer system 160 as part of a request for assistance in debugging the system 110 or more specifically, in identifying why and how data became corrupted in memory 130.

The operating system 116 may also take many forms such as Solaris, UNIX, PICK, MS-DOS, LINUX, and the like and generally is a software program that manages the basic operations of the computer system 110. The operating system 116 includes a memory manager 118 that operates to manage the memory hierarchy of the system 110 by, among other functions, keeping track of which parts of memory 130 are in use and not in use, allocating memory portions or segments to user programs 132 and to the operating system 134 and kernel 136 when they need memory 130 and deallocating the memory 130 when these process are done, and managing transfer of data from memory 130, registers, and disk or other memory from memory 130. Problems with the memory manager 118 (or user programs 122 and the kernel 128) can result in corruption in memory 130 either in the user program space 132 or in the operating system space 134. For example, one user program 122 may overwrite its data to portion of memory 132 assigned to a second user program 122.

The operating system 116 is shown divided into a user space 120 that is accessible by users and contains user programs and into a kernel space 126 that is generally not accessible by users and contains the kernel 128. The kernel 128 is a portion or level of the operating system 116 that is always running when the operating system 116 is running and contains system-level commands or all the functions hidden from the user including device drivers, memory management routines, the scheduler, and system calls. In response to a user instruction or upon a crash of system 110, the CPU 112 acts to generate a core file 138 which is a core image providing a state of the computer system 110 at the time of the core dump and includes a state of the stack 136 for the program running at the time of the crash or core dump and includes assembly code for all the functions in the user program 122 or kernel 128. During operation, an operator of the system 110 may transmit a request for assistance (e.g., debugging help) over the network 150 to the debugging computer system 160. A copy of the core file 138 is transmitted with the request or separately to the debugging computer system 160 via communications network 150 or otherwise (such as on a disk or other portable memory device).

The client support computer system 160 includes a network interface 162 communicatively linking the system 160 to the communications network 150 and communicating with the client computer system 110. The client support computer system 160 includes a CPU 164 managing operations of the system 160 including the debugger 166, the user interface 178 (such as a command line interface, GUI, and the like), and the memory 170. Received crash dumps or core files 172 are stored by the CPU 164 in memory 170 for later processing by debugger 166. Also stored in memory 170 are data structure rules 174 for analyzing data corruption evidenced in received core files 172 (as discussed with reference to FIG. 2) that may be created and validated by an operator of the system 160 or that may be provided by a third party, such as creator of the data structures (e.g., an operator of client computer system 110) or a debugger in communication with system 160. As with the client computer system 110, the client support computer system 160 and its hardware and software components may take numerous forms and configurations to practice the invention.

The debugger 166 is generally a software and/or hardware mechanism that functions to process the received core file 172 at the instruction of a user via user interface 178 and/or automatically to determine an extent or scope of data corruption in memory 130 as indicated in the received core files 172 (e.g., a copy of crash dump 138) and a cause of such corruption. In this regard, a memory analysis tool 168 is provided to process the received core files 172 and interact with an operator (i.e., a debugger) of the user interface 178 to identify corrupted data structures in memory 130 for executed code (such as user programs 122 space 132 or kernel 128 space 136) and to process such data structures for patterns or other indicators of the cause of the data corruption. The functioning of the memory analysis tool 168 is described in detail with reference to FIGS. 2–4.

Figure 2:
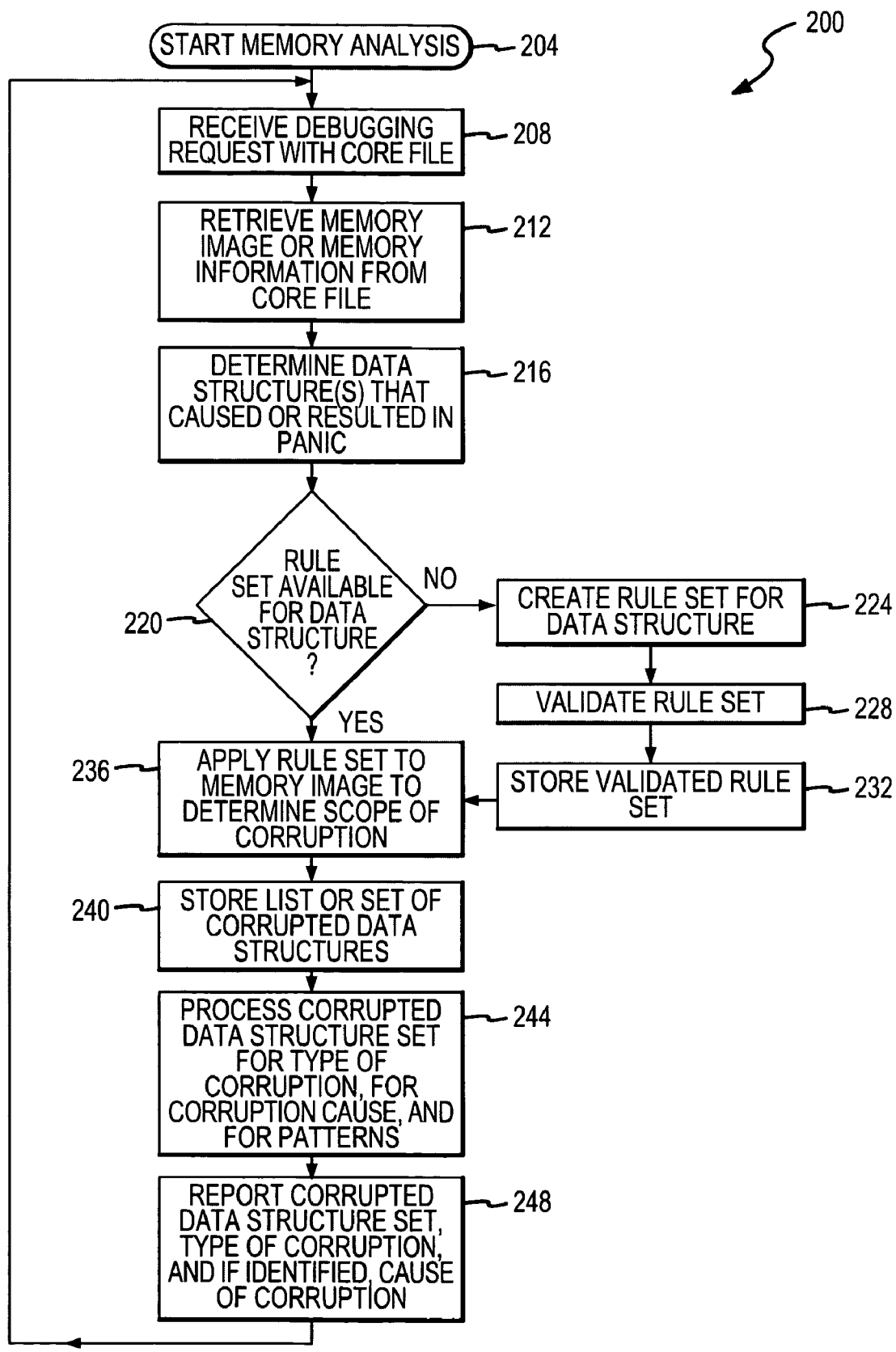
FIG. 2 is a flow chart illustrating an exemplary memory analysis performed by a debugger of the present invention such as the debugger of the technical support system of FIG. 1.

FIG. 2 illustrates a data corruption analysis process 200 performed by the memory analysis tool 168 during operation of the system 100. As shown, the process 200 starts at 204 typically by loading the memory analysis tool 168 into the debugger 166. As will become clear, the memory analysis tool 168 generally includes one or more mechanisms for comparing data structures in a memory image with a set of data structure formation or content rules to check or verify consistency or compliance with the rules, with a lack of consistency with the rules indicating corruption of the data content or data structure. The term "data structure" as used herein is a very broad and generic term for any memory construct used to hold data and may range significantly in size (down to one byte or less) and complexity, and may include such items as process variables, memory or other pointers, method data, and much more. A data structure can be thought of as a formal collection of related data or more generally as a representation in a precise, formalized language of some facts or concepts, often numeric or alphabetic values, to facilitate manipulation by a computational method.

Figure 3:
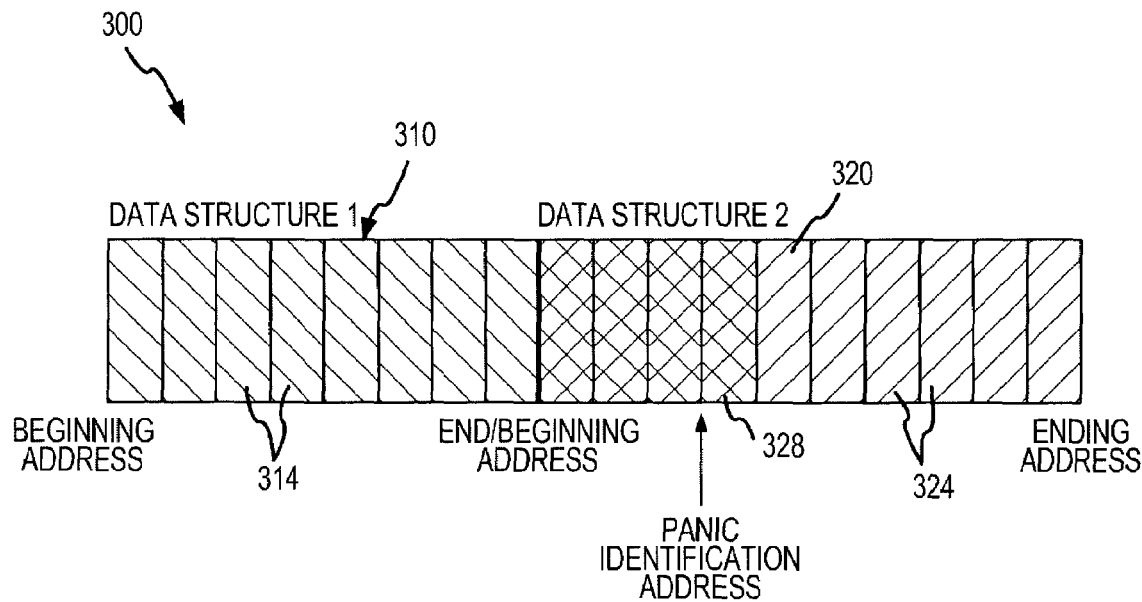
FIG. 3 is a simplified illustration of a portion of system memory illustrating corruption of contiguous members of one data structure by overwriting by an adjacent or neighboring data structure.
Figure 4:
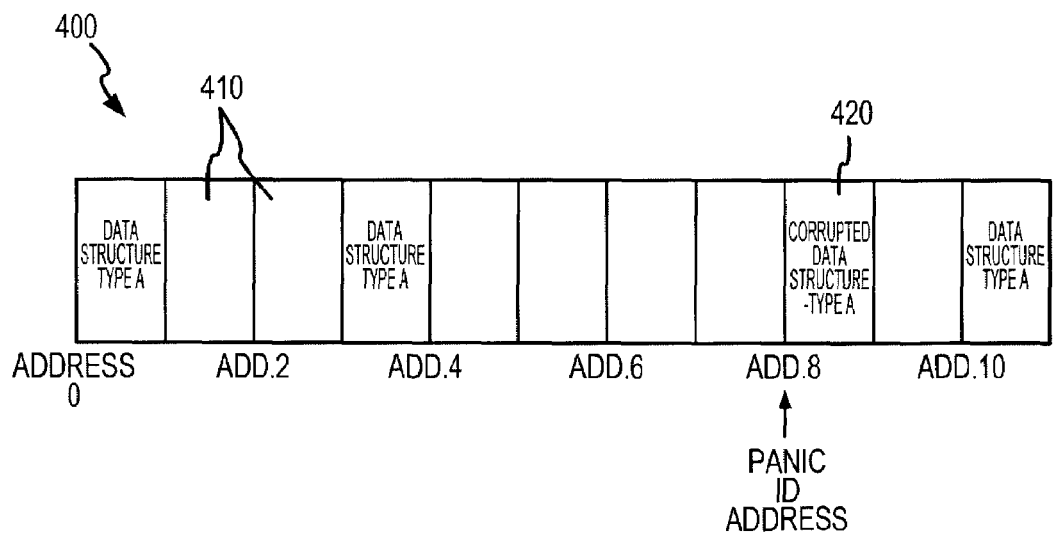
FIG. 4 is another illustration of a portion of system memory illustrating corruption of one data structure and non-contiguous locations of other data structures having a similar structure, i.e., complying with a similar set of construction rules.

At 208, a copy of a crash dump 138 is received such as part of a debugging or assistance request from client computer system 110 and is stored as a received core file 172 in memory 170. At 212, the memory analysis tool 168 acts to retrieve a memory image or information on the memory 130 from the received core file 172. Exemplary and simplified memory images 300, 400 are illustrated in FIGS. 3 and 4 containing a plurality of data structures and/or data structure members. The data structures that caused the panic that resulted in the crash dump 138 being created are identified at 216 (such as data structure 328 in memory image 300 of FIG. 3 and data structure 420 of memory image 400 of FIG. 4). In some embodiments, such identification is performed automatically by the memory analysis tool 168 processing the core file 172 while in some cases identification is performed manually by an operator of the debugger 166 utilizing their experience in determining causes of panics and recognizing corrupted or problems in memory and data structures.

With a panic-causing data structure identified, the process 200 continues at 220 with searching the data structure rules 174 for a rule set for the identified data structure. For example, the identified data structure may be a kernel memory pointer for the client computer system 110 and the rule set may define allowable values for such pointers based on acceptable values for kernel memory 136 addresses. If a rule set is found in the stored data structure rules 174, the memory analysis tool 168 performs consistency checking in the memory image by identifying other data structures that are related to the identified data structure and comparing the values or data in these other data structures with the expected or acceptable values or value structures defined in the rule set. At 240, data structures determined to be corrupted in steps 216 and 236 are stored in memory 170 for reporting purposes and for further analysis. In this manner, the memory analysis tool 168 is effective at accurately and effectively identifying the size or scope of the corruption of data in the memory 130 based on the received core file 172.

The process 200 continues at 244 with the memory analysis tool 168 facilitating the analysis of the set of corrupted data structures to determine whether a cause of the data corruption exists that can be reported to the client computer system and/or that can be utilized for debugging the underlying kernel 128, user program 122, and/or memory manager 118. The cause determination of 244 can be performed at least partially automatically by the memory analysis tool 168 and typically will involve input and manual analysis from an operator of the debugger 166 via user interface 178. Cause determination at 244 can involve searching for a type of corruption, such as bit-flips, that may indicate a cause, for patterns in the corruption such as a repeated problem in each data structure that may indicate a source of the corruption, and/or simple overwriting of a portion of contiguous memory indicating a program or process has exceeded its allotted memory. At 248, a report is generated and transmitted to the user interface 178 of the client support computer system 160 and/or to the client computer system 110. The report may simply provide a listing of all corrupted data structures (i.e., the scope of the corruption) or may further include the results of the analysis at step 244 including identified patterns in the corruption and, if determined, a cause of the corruption.

Returning to step 220, if a rule set for the identified data structure is not found in stored rules 174, the process 200 continues at 224 with the creation or establishment of a rule set for the identified data structure. Typically, the memory analysis tool 168 acts to prompt the user via the user interface 178 for input of a rule set (e.g., "No Consistency Rule Set Found. Input Rule Set for Analysis of Identified Data Structure."). At 224, a user may also be requested to select a rule set from two or more rule sets 174 that may be found at 220 that fit the identified data structure. The user inputs a rule set at 224 and at 228 the rule set may optionally be validated, such as by applying the rule set with the tool 168 to a set of known "good" or uncorrupted data structures having a similar type or structure as the identified data structure or on core files with no known memory corruption. If necessary, the rule set may be modified if "good" data structures fail the consistency checking with the created rule set and steps 224 and 228 are repeated until the created rule set is validated. At 232, the validated rule set is stored as a data structure rule 174 in memory 170 for use by the memory analysis tool 168 at 236 and with analysis of future received core files 172. With a general understanding of the analysis method 200 understood, it might be useful to discuss specific memory corruptions and how the tool 168 and operating method are useful in determining a scope and cause of memory corruption.

FIG. 3 illustrates an exemplary memory image 300 that may be included in a received core file 172 when memory 130 becomes corrupted in client computer system 110. As shown, a first data structure 310 with a number of members 314 is allocated a range of memory addresses from a beginning address to an ending address. A second data structure 320 is included in image 300 that begins at the ending address of the first data structure 310 and continues on to an ending address with a number of data structure members 324. When the image 300 is analyzed by the tool 168 as discussed in process 200, the data structure member 328 is identified in step 216 as the data structure that caused the panic and has a panic identification address. The rule set for data structure member 328 may indicate that data structure members from the beginning address to the ending address of data structure 320 are related at least by location. Further, each of the data structure members 324 of structure 320 may have expected values or form. For example, if the members 324 are expected to contain a value for a process variable, the values or data in the members 324 should be consistent with expected values, e.g., for point data structure for a graph it may be expected that the x and y coordinates provided in the member 324 would fall within a specific range of x and y values.

When the process 200 is applied to the image 300, the rule set is applied at 236 for each of the members of the data structure 320 to determine the scope of the corruption, such as by determining if each member 324 from the beginning to the ending address are consistent with expected data types and/or values. In the illustrated example, although the data structure member 328 caused the panic, the four members 324 upstream or with earlier memory addresses are also identified as corrupted and the list of corrupted members 324 of data structure 320 are stored in step 240 for additional processing. At 244, the list of corrupted structures in the image 300 is examined to identify a type or pattern of the corruption. In the illustrated case, a contiguous set of members 324 are corrupted which indicates a failure to properly allocate memory 130 (such as by the memory manager 118) and/or a failure of a program utilizing an adjacent memory range, such as the kernel or user program assigned memory for data structure 310. The tool 168 is useful for identifying the "first corrupted" data structure member which is useful for identifying the cause of the corruption.

Often, corruption will not be present in contiguous or in adjacent data structures. FIG. 4 illustrates a memory image 400 including a plurality of data structures 410 some being related by type (such as kernel memory pointers and the like) but not being located in adjacent memory addresses in image 400. At 216 of process 200, the structure 420 is identified as the corrupted data structure causing the panic in the system 110. At 220, the data structure 420 is examined and a rule set for that type of data structure is retrieved or identified (such as for all data structures of "Type A"). As illustrated, the data structures 410 in image 400 are not related by location or address but instead by the type or structure of the data structures 410. For example, the type or configuration of identified data structure 420 may indicate it is a kernel memory pointer. At 236, each related data structure 410 in memory image 400 is checked for consistency with the rule set found or generated for identified data structure 420. In a kernel memory pointer case, the rule set may include an allowable range of pointer values and each of the related data structures (i.e., the Type A structures) would be checked to determine if the contained pointer value is within the allowable range. Those found outside the range would be marked as corrupted and stored at step 240 of process 200. As can be seen, the memory analysis tool 168 and process 200 are useful for identifying a scope of corruption for a wide range of memory corruptions as long as a rule set can be developed or exists that relates data structures and/or provides a test for corruption of the data structure.

The number of rule sets that can be developed and the variety of data structures are quite large, and it would be unwieldy to attempt to list or describe each that might be included or analyzed according to the invention. However, it may be useful to provide a few more examples of applications of the analysis tool 168 and its operating methods. A data structure that is corrupted may include a linked list, and the rule set may indicate acceptable link values and types. Analysis of the cause of the corruption once the scope of corruption is determined may involve walking the linked list in both directions or one direction (although corruption may block stepping the list in one or both directions) using a reverse list to compare against the forward or backward list to see if a match occurs, thereby learning more details about the scope and the values held in data structures prior to the corruption. In some cases, the rule set may include the value of lists and/or pointers, such as when all pieces or members of a data structure are allocated from a contiguous chunk of memory. The data structures can then be checked for consistency or corruption to see if their values fit within the bounds of memory allocated for the data structure.

As another example, a list of names may be stored along with a count of how many names are on the list. The rule set may include the count and analysis may include walking the list and then comparing the results to the count. In yet another example, a list of free memory and a list of allocated memory may be stored. The rule set may identify these lists and analysis can involve comparing the two lists with any overlap indicating corruption. This set of examples provides a few examples of possible rule sets but the number of rule sets that can be used with the present invention is almost as large as the number of data structure configurations and the invention is not intended to be limited to the examples provided with many other rule sets and applications being readily apparent to those skilled in the arts with the teaching found herein. In many cases, the rule set is developed by one person who is familiar with how a subsystem in a computer program works. Once the rule set is established, another person who is unfamiliar with, or has limited knowledge of that subsystem can efficiently and effectively analyze that subsystem for problems using the system and method of the present invention.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A computer-based method for analyzing computer system memory corruption after a memory corrupting event in a computer system, comprising:
   retrieving a memory image in a computer system generated after the event in the computer system;
   identifying automatically a data structure in the memory image linked to the event;
   applying a data structure rule set to the memory image to determine a scope of corruption in the memory, wherein the data structure rule set is selected based on the identified data structure;
   selecting an identified data structure rule set associated with the data structure linked to the event;
   checking the memory image for consistency by checking other data structures related to the identified data structure and comparing data in these other data structures with acceptable values defined in the identified data structure rule set;
   responsive to determining that at least one of the other data structures is corrupted, storing the corrupted other data structure for reporting and further analysis;
   responsive to the data structure failing to be automatically identified, prompting a user to select a rule set from two or more rule sets that may fit the data structure;
   wherein analysis of each corrupted identified data structure includes a list linked to one of the rule sets indicating acceptable data values and types, the analysis comprising walking the linked list in at least one direction using a reverse list to compare data values and types against the linked list to determine the cause of the corruption; and
   generating a report for review by the use on a user interface identifying patterns of memory corruption and a cause of the corruption.

2. The method of claim 1, wherein the applying is performed on other data structures in the memory image related to the identified data structure by type or location.

3. The method of claim 2, further including prior to the applying, processing the identified data structure to determine the location and the data structure type for the identified data structure and retrieving the data structure rule set based on the processing.

4. The method of claim 1, further including prior to the applying, creating the data structure rule set for the identified data structure to define a set of data structure characteristics for other data structures in the memory image related to the identified data structure.

5. The method of claim 4, further including validating the created data structure rule set prior to the applying including applying the created data structure rule set to an uncorrupted memory image having data structures complying to rules in the created data structure rule set.

6. The method of claim 1, further including receiving the memory image in a crash dump file generated for the computer system.

7. The method of claim 1, wherein the scope is defined by a set of corrupted data structures including the identified data structure and other data structures in the memory image which did not comply to the rule set in the applying.

8. The method of claim 7, further including processing the set of corrupted data structures to determine a cause of the corruption in the memory.

9. The method of claim 8, wherein the processing includes identifying a pattern to the corruption in the set of corrupted data structures.

10. The method of claim 8, wherein the report includes a listing of at least a portion of the set of corrupted data structures.

11. A computer implemented method for identifying a cause of memory corruption, comprising:
   providing a set of corrupted data structures from a computer system memory;
   identifying a pattern to data corruption in the data structures; and
   processing the pattern of the data corruption to determine a cause of the data corruption,
   wherein the providing includes identifying one of the corrupted data structures as a cause of a memory corrupting event in the computer system memory, selecting a rule set based on the identified corrupted data structure, locating other data structures in the memory related in structure to the identified corrupted data structure, comparing the other data structures to the rule set to generate the set of corrupted data structures wherein comparing includes comparing data values and data types against acceptable linked values and linked types listed in a linked list to determine the cause of the corruption and prompting a user to select a rule from two or more rule sets that may fit the identified data structure,
   wherein the analysis of the cause of the corruption includes walking the linked list in at least one direction using a reverse list; and
   generating a report for review by the use on a user interface identifying patterns of memory corruption and the cause of the corruption.

12. The method of claim 11, wherein the set of corrupted data structures is related based on location in the computer system memory.

13. The method of claim 11, wherein the set of corrupted data structures is related based on content of data in the data structures.

14. The method of claim 11, further including creating the rule set for the identified corrupted structure and validating the rule set using uncorrupted data structures.

15. The method of claim 11, wherein the providing includes receiving a core file from a computer system having the memory generated after a panic in the computer system.

16. A client support computer system, comprising:
a memory device storing a received core file for a client computer system having a memory image for the client computer system and storing data structure rules for a plurality of data structures;
a memory analysis tool configured to retrieve the memory image of the received core file, to select one of the data structure rules, and to apply the selected one of the data structure rules to a set of data structures in the memory image to create a list of corrupted data structures in the memory image,
wherein the memory analysis tool is further configured to process the memory image to identify a data structure that caused an event resulting in the corrupted data structures in the client computer system, perform the selecting based on the identified data structure, and select an identified data structure rule set associated with the identified data structure,
wherein the memory analysis tool processes the memory image to establish the set of data structures for applying the selected one of the data structure rules based on construction or location of the identified data structure,
wherein, responsive to the memory analysis tool failing to select the identified data structure rule set, the memory analysis tool prompts a user to select a rule set from two or more rule sets that may fit the identified data structure, and
wherein the data structure includes a linked list, the selected data structure rule set indicates acceptable link values and types, and the analysis of the cause of the corruption includes walking the linked list in at least one direction using a reverse list comparing acceptable data values and types from the selected data structure rule set with those of the identified data structure; and
generating a report for review by the use on a user interface identifying patterns of data corruption and the cause of the corrupted data structures.

17. The system of claim 16, wherein the memory analysis tool processes the list of corrupted data structures to identify a pattern in data corruption.

* * * * *